United States Patent [19]

Sperko

[11] Patent Number: 5,072,960

[45] Date of Patent: Dec. 17, 1991

[54] STERILIZER CART

[75] Inventor: Walter J. Sperko, Greensboro, N.C.

[73] Assignee: Sterilizer Technologies Corporation, Kernersville, N.C.

[21] Appl. No.: 480,231

[22] Filed: Feb. 15, 1990

[51] Int. Cl.[5] .......................... B62B 5/00; B62B 3/04; B60B 33/02

[52] U.S. Cl. .......................... 280/47.34; 280/33.998; 16/35 D; 410/19; 410/22; 414/401

[58] Field of Search ....................... 280/33.998, 33.992, 280/47.34, 47.35, 79.11, 79.2; 414/396, 401, 584; 16/35 D; 410/19, 22

[56] References Cited

U.S. PATENT DOCUMENTS

| 1,202,706 | 10/1916 | Grehan | 280/33.998 X |
|---|---|---|---|
| 1,750,129 | 3/1930 | Romine | 280/33.998 X |
| 1,750,131 | 3/1930 | Romine | 280/33.998 X |
| 2,583,858 | 1/1952 | Kostolecki | 16/35 D |
| 2,649,217 | 8/1953 | Mertes | 414/401 X |
| 2,709,829 | 6/1955 | Marvin | 16/35 D X |
| 3,869,052 | 3/1975 | Leahy | 414/401 |
| 4,280,246 | 7/1981 | Christensen | 16/35 D |
| 4,743,039 | 5/1988 | Ellis | 280/47.34 X |

FOREIGN PATENT DOCUMENTS

| 24163 | 11/1930 | Australia | 414/401 |
|---|---|---|---|
| 250533 | 10/1926 | France | 414/401 |
| 901524 | 7/1962 | United Kingdom | 414/401 |

Primary Examiner—Andres Kashnikow
Assistant Examiner—Brian L. Johnson

[57] ABSTRACT

A sterilizer cart for transporting a wheeled carriage, the cart having improved control and docking capabilities utilizing a docking post receptacle having a hinged tongue. The front caster wheel assemblies of the cart are provided with spring-loaded guide members which are selectively urged into and out of indentions in detent members for wheel steering. The invention also provides a method for easily directing the wheeled carriage from the cart along rails for convenient carriage insertion into and extraction from a sterilizer equipped matching rails and a centralized docking post.

6 Claims, 5 Drawing Sheets

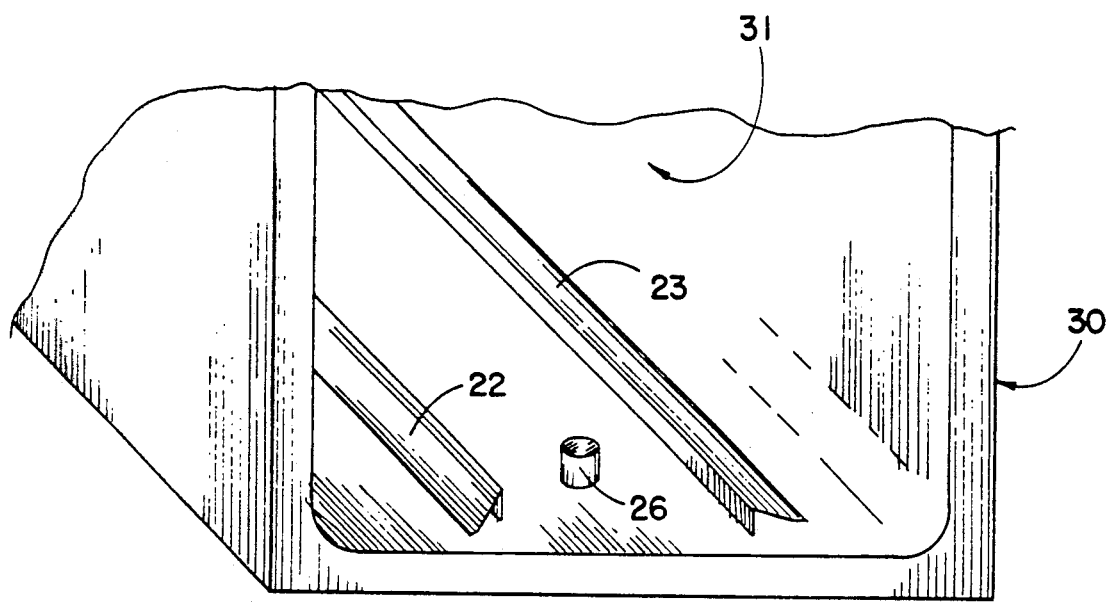
FIG. 4
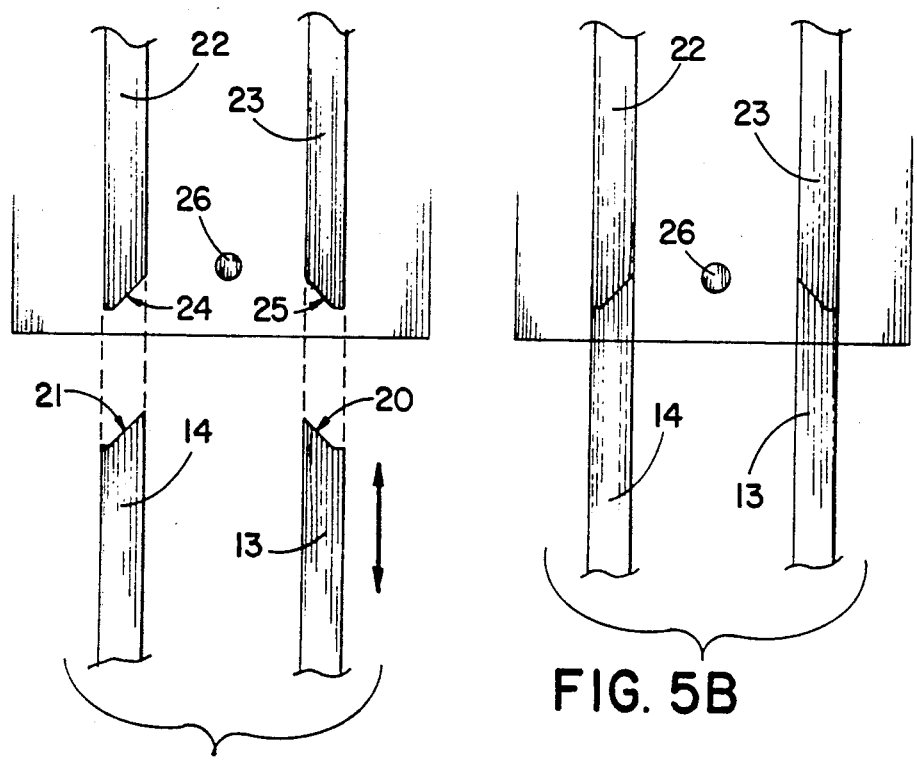
FIG. 5A
FIG. 5B

STERILIZER CART

BACKGROUND OF THE INVENTION

1. Field Of The Invention

The present invention relates to sterilizer carts and methods for use and particularly to carts which transport a wheeled carriage that can be rolled into the sterilizer as the cart docks therewith.

2. Description Of The Prior Art And Objectives Of The Invention

It is standard practice in hospitals and other organizations requiring sterilized appliances and instruments to utilize manually propelled carts constructed to transport wheeled sterilizer carriages thereon. Such carts can be maneuvered throughout various areas of the hospital and unsanitized appliances, instruments and other equipment can be placed within the carriage for subsequent sterilizing. Once the carriage has been sufficiently loaded the cart is pushed to an autoclave or other sterilizing unit which is adapted for docking with the cart and to receive the laden carriage. The carriage is conventionally rolled along rails atop the cart, said rails for aligning with comparable rails mounted within the sterilizing unit. Once the carriage has been directed into the sterilizer along the rails, the cart is removed and the sterilizer door closed for the processing cycle. Thereafter, the sterilizer door is opened, and the cart is again docked and the carriage rolled from the sterilizer onto the cart for return to a central supply area where the instruments and equipment are removed and stored for reuse. Sterilizer carriages are generally constructed of stainless steel and when loaded may weigh several hundred pounds. Hence, it is important that the docking, insertion and extraction of the carriage into and from the sterilizer be as simple, quick and accurate as possible. The increasing cost of labor for medical personnel has necessitated the employment of relatively unskilled personnel to collect instruments and equipment for sterilizing, and in the past carriages have been carelessly inserted and improperly positioned within sterilizers, causing the sterilizing cycle to be less than fully effective. Also, conventional carriages have even been derailed within the sterilizer, causing damage or at least great difficulty in righting the carriage so it can be extracted. With the temperatures inside the sterilizer reaching well over 200° F., it is extremely important, for the sake of safety and to save time and energy that the docking and movement of the carriage from the cart to the sterilizer be precisely and promptly achieved. Once the sterilizing cycle is completed, only minimum handling of the carriage during extraction is desired so as many cycles of sterilization per shift as possible can be carried out. Also, during loading and unloading of carriages from conventional sterilizer carts, one of the rails of the cart may be misaligned or spaced from its complementary rail within the sterilizer. This can cause a carriage wheel to derail and if this happens the carriage, weighing several hundred pounds, may have to be manually lifted and placed back on track at great inconvenience for entry or exit with the sterilizer.

The aforesaid advantages and problems associated with prior art carts, carriages and methods have been overcome by the invention described herein and one of its objectives is to provide a sterilizer cart and method for docking a sterilizer cart with a sterilizer by providing the sterilizer with a docking post and providing the sterilizer cart with a v-like receptacle for receiving said post for alignment and engagement therewith during docking.

It is another objective of the present invention to provide a sterilizer cart with casters which include a detent member whereby the cart can be relatively easily, laterally shifted and steered for better alignment with the sterilizer heating chamber during carriage insertion or extraction.

It is yet another objective of the present invention to provide a caster assembly having a spring-loaded means to guide the wheel and a detent member contiguous thereto whereby the guide member is releasably secured in an indention along the detent member for release therefrom for final steering ease and cart alignment with the sterilizer heating chamber.

It is also an objective of the present invention to provide a sterilizer cart which has biased rail ends which will abut complementary biased rail ends within the sterilizer heating chamber to insure safety, ease and convenience in rolling a carriage thereover.

It is still another objective of the present invention to provide a cart having a docking post receptacle which comprise a pair of post side guide members which form a v-like opening therebetween and which also includes a spring-loaded hingeable tongue which can be raised during docking by contact with a sterilizer docking post and thereafter can be manually raised by a control rod assembly on the cart for withdrawing the cart from the docked positioned.

Various other advantages and objectives of the invention will become apparent to those skilled in the art as a more detailed description of the apparatus and its methods are presented below.

SUMMARY OF THE INVENTION

The aforesaid and other objectives are realized by providing a sterilizer cart and method which, when used in conjunction with an improved sterilizer apparatus, forms a combination which makes for precise and efficient sterilizer carriage loading and unloading. The sterilizer is provided with a pair of internal carriage rails which have biased front ends and therebetween is positioned a docking post for cooperative engagement with the sterilizer cart. The sterilizer cart includes a v-like post receptacle and a receptacle tongue which is hingedly mounted on the cart frame. Also included on the cart are front caster assemblies whereby the front wheels are directed in accordance with a spring-loaded caster guide which is resiliently urged against a detent member affixed to the caster assembly wheel. The spring-loaded caster guide holds the caster wheel in a fixed position during normal cart movement and allows for ease in lateral cart steering during docking. The front caster assembly wheels are connected to a yoke which partially surrounds the wheel and the spring-loaded caster guide is positioned upon the yoke. The cart with a loaded sterilizer carriage is directed into position with a sterilizer as the post receptacle with a spring-loaded tongue of the cart engages the sterilizer post within the sterilizer heating chamber. If the carriage rails on the sterilizer cart do not align properly with the sterilizer rails within the sterilizer heating chamber with the post enclosed within the receptacle, the rear of the cart can be shifted to the left or right as necessary whereby the detent members of the front casters slide along the spring-loaded guides of the cart front legs, whereby the front wheels will sharpely turn allowing the cart to be somewhat laterally steered so the rails of the cart and sterilizer will abut in a straight, aligned fashion. The front ends of the carriage tracks or rails which are on top of the cart frame, as earlier mentioned, have biased ends which matingly abut the complementary carriage rail ends within the sterilizer heating chamber to allow the sterilizer carriage to smoothly roll from the cart rails to the sterilizer rails without opportunity for the carriage wheels to derail therebetween as the carriage enters the sterilizer heating chamber. The method of the invention also comprises releasing the sterilizer tongue from the docking post and withdrawing the cart once the carriage has been inserted into the sterilizer whereby the sterilizer door can be closed and the sterilizing process begun. Once the sterilizing cycle is complete, the sterilizer heating chamber door is opened, the cart redocked and the carriage quickly and safely rolled onto the cart and the cycle begun anew.

BRIEF DESCRIPTION OF THE DRAWINGS

FIG. 4 shows in partial schematic fashion a sterilizer chamber having a pair of internal carriage rails;

FIG. 5A illustrates in schematic fashion a set of the cart and sterilizer carriage rails prior to abuting;

FIG. 5B pictures the sterilizer internal carriage rails and the cart carriage rails at abutment;

DESCRIPTION OF THE PREFERRED EMBODIMENTS

The preferred form of the cart of the invention comprises a metal frame having a pair of carriage rails mounted thereon. The front ends of the rails are biased to matingly abut complementary biased rails within the sterilizer chamber. A guide post receptacle is positioned on the front of the cart which includes a pair of guides opposingly angled to form a v-like opening. A receptacle tongue is hingedly mounted and spring-loaded on the frame above the v-like opening and extends forwardly from its hinged position whereby said tongue will pivot upwardly upon contact with the sterilizer docking post to allow the docking post to enter the receptacle. Once the post has sufficiently penetrated the receptacle and contact discontinued with the tongue, the tongue will pivot to a closed position, locking the post therein. A manual control rod assembly is attached to the tongue and includes a crank member joined thereto. A control rod and handle are affixed to the crank member. The control rod extends longitudinally along the cart to the rear whereby the operator can manually lift the tongue by using the handle to release the cart from the docking post. The cart is also provided with front caster assemblies which include means for changing the direction of the front wheels to assist in steering the cart. Each front caster assembly includes a detent member which is affixed to a yoke partially surrounding each wheel on the front legs of the cart. A means to guide the wheel is resiliently attached to the front cart legs whereby, by laterally shifting the rear of the cart manually after docking, the front wheels will adjust their direction and the cart rails can be better aligned with the sterilizer rails within the heating chamber. The sterilizer includes an internal heating chamber and chamber door with a docking post mounted within the heating chamber, centrally located between the chamber rails which have biased proximal ends for providing complementary abutment with the carriage rails of the cart. The biased rail end configuration insures that the carriage wheels will smoothly roll from the cart rails onto the sterilizer rails without fear of the wheels dropping between spaces in the rails which could make the carriage difficult, if not impossible to roll into the sterilizer.

DETAILED DESCRIPTION OF THE DRAWINGS AND OPERATION OF THE INVENTION

Figure 1:
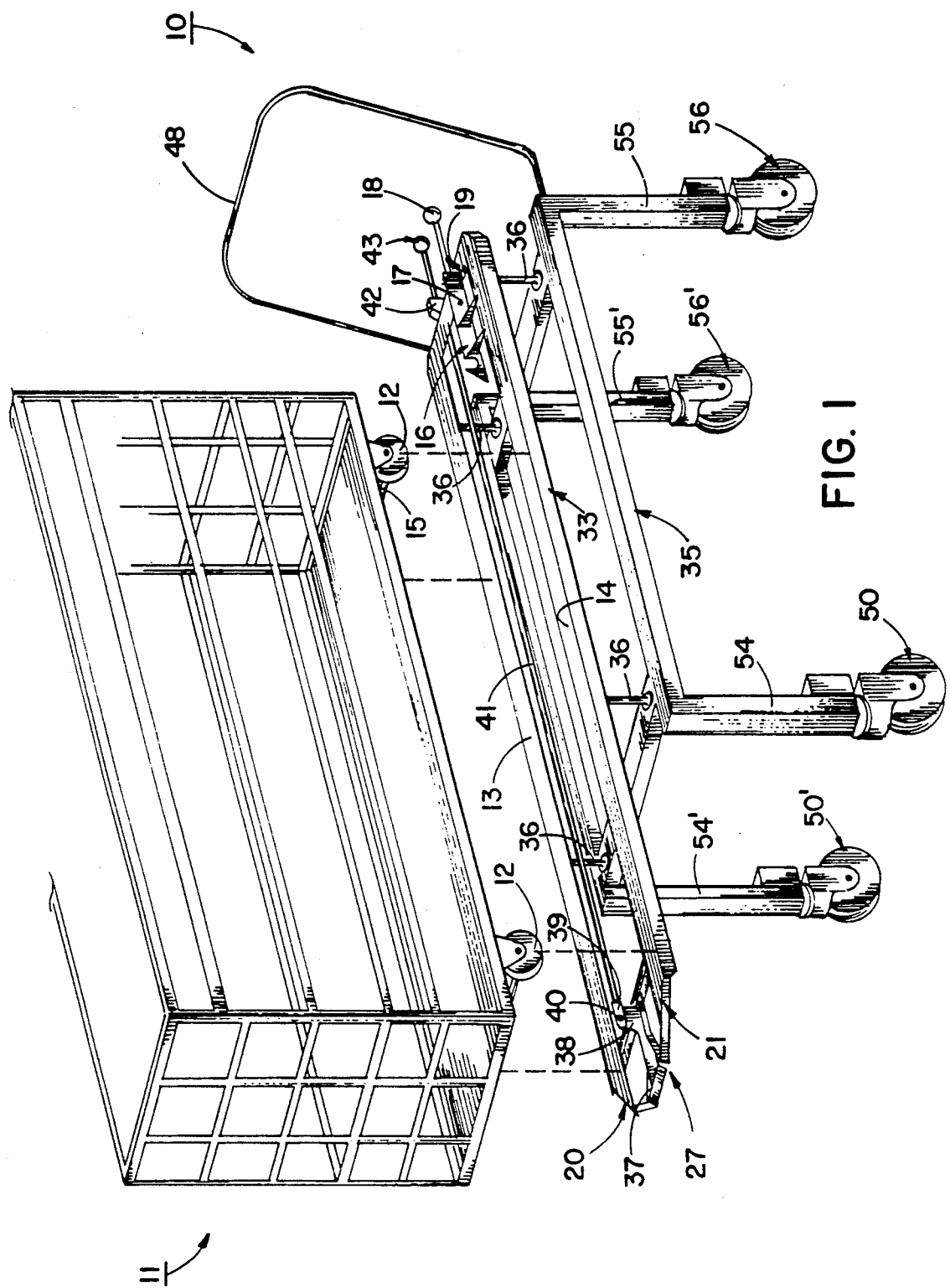
FIG. 1 illustrates the sterilizer cart of the invention with a sterilizer carriage shown removed therefrom.

Turning now to the drawings, sterilizer cart 10 as shown in FIG. 1 is used to transport sterilizer carriage 11 throughout a hospital or other complex to collect used or unsanitary equipment such as medical instruments, patient appliances, hospital garments or other supplies that require sterilizing. Sterilizer carriage 11 is formed from stainless steel and includes wheels 12 which roll along cart rails 13 and 14.

Figure 2:
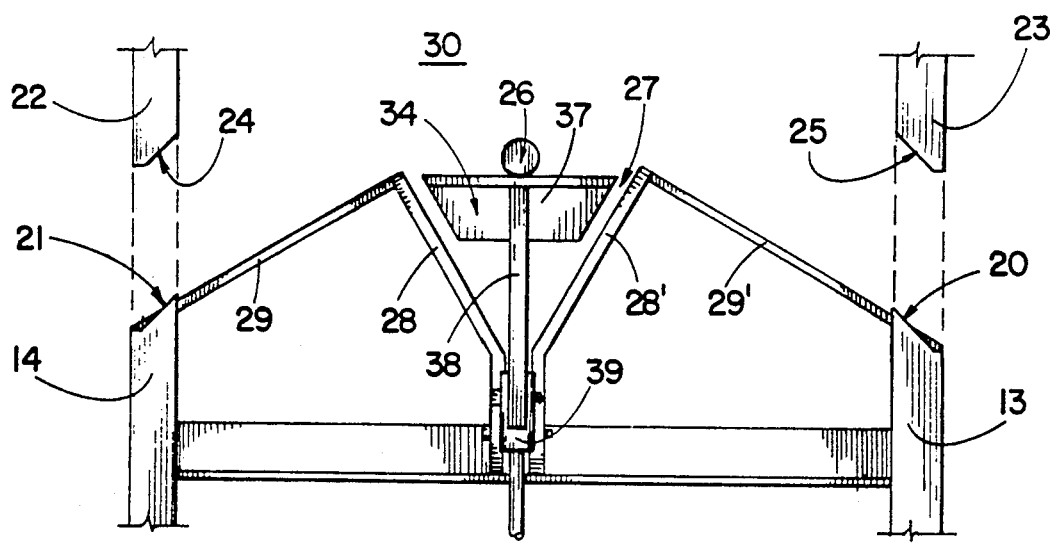
FIG. 2 demonstrates a top view of the front portion of the cart having a v-like post receptacle.

Cart rails 13 and 14 have biased ends 20 and 21 as seen in FIGS. 2, 5A and 5B. Biased ends 20 and 21 are so designed to matingly abut internal chamber sterilizer rails 22 and 23 having complementary biased ends respectively 24 and 25 as shown in FIG. 2. As would be understood from the position of internal chamber rails 22 and 23 as illustrated in FIG. 4, relative to sterilizer post 26, biased end 24 of left internal chamber rail 22 and biased end 25 of right sterilizer internal chamber rail 23 meet as shown in FIG. 5A and 5B to form an angular abutment to accommodate the rolling of carriage wheels 12 thereover. In the event that cart rails 13 and 14 do not precisely align with chamber rails 22 and 23, the biased ends will assist in maintaining the carriage "on track" and prevent it from derailing, due to the angular or biased rail ends which make for a smoother wheel transition from said cart rails to said sterilizer rails than would occur if said ends were "square cut".

As shown in FIG. 4, rails 13, 14, 22 and 23 are all formed from conventional ninety degree angle stainless steel for strength and durability to insure proper docking of cart 10 with sterilizer 30. As also shown in FIG. 4, sterilizer docking post 26 is positioned between chamber rails 22 and 23 on the floor of chamber 31. Docking post 26 is engaged by v-like opening 27 formed by post guides 28, 28' which are attached to frame members 29 and 29' connected to rails 13 and 14 which, as seen in FIG. 1, are affixed to main cart frame 35. Cart frame 35 may be formed from steel or aluminum and painted to prevent corrosion if necessary in contrast to cart rails 13 and 14 which are formed from stainless steel as are the components within sterilizer chamber 31. Upper cart frame 33 is attached to main cart frame 35 by adjustable stanchions 36 as seen in FIG. 1. In order to insert carriage 11 into sterilizer 30, cart 10 is directed towards inner chamber 31 after opening the chamber door (not shown in FIG. 4).

Figure 3A:
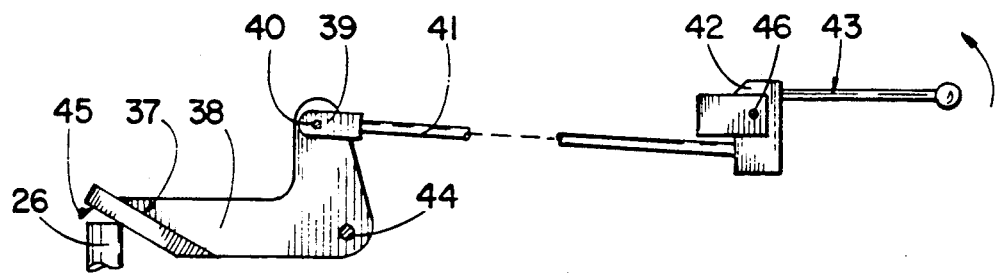
FIG. 3A shows a side view of the receptacle tongue removed from the cart and positioned proximate the docking post.
Figure 3B:
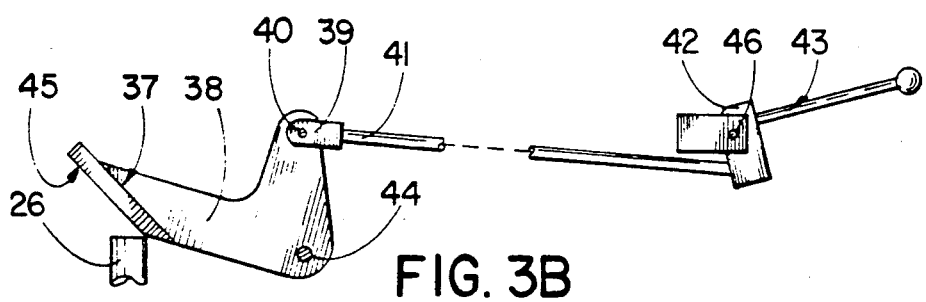
FIG. 3B depicts the pivoting action of the post as it begins to pass over the post.

Pushing cart 10 to align properly with sterilizer 30 can at times be a problem depending on the particular load of carriage 11 and the skill and experience of the operator. In any event, with an approximate alignment, docking post 26 enters v-like opening 27 of guide post receptacle 34 which includes post guides 28, 28' and receptacle tongue 37. As seen in FIG. 3, tongue 37 is affixed to tongue crank 38 which in turn is joined to turnbuckle fork member 39 by pivot pin 40. Fork member 39 is threadably attached to control rod 41 which extends longitudinally along cart 10 and is pivotally joined to handle crank 42 attached to control handle 43. By lifting handle 43, receptacle tongue 37 raises as shown in FIG. 3B since handle crank 42 rotates around pivot axle 46 joined to upper cart frame 33. When guide post receptacle 34 is aligned with docking post 26 as shown in FIG. 3A, receptacle tongue 37 contacts post 26 and as cart 10 is urged forward, tongue 37 raises with rotation of tongue crank 38 around crank axle 44 and due to sloping face 45 of receptacle tongue 37. Thus, as tongue 37 passes over sterilizer docking post 26, tongue 37 lowers to maintain post 26 at the rear of the v-like receptacle 27 and release thereafter is obtained by manually lifting control handle 43.

Though docking post 26 is now within v-like opening 27, rails 13 and 14 may not be completely, properly aligned with internal chamber sterilizer rails 23 and 22 respectively. Thus, the operator must laterally shift the cart in order to bring the rails into a more precise alignment as will be explained in detail below.

Figure 7:
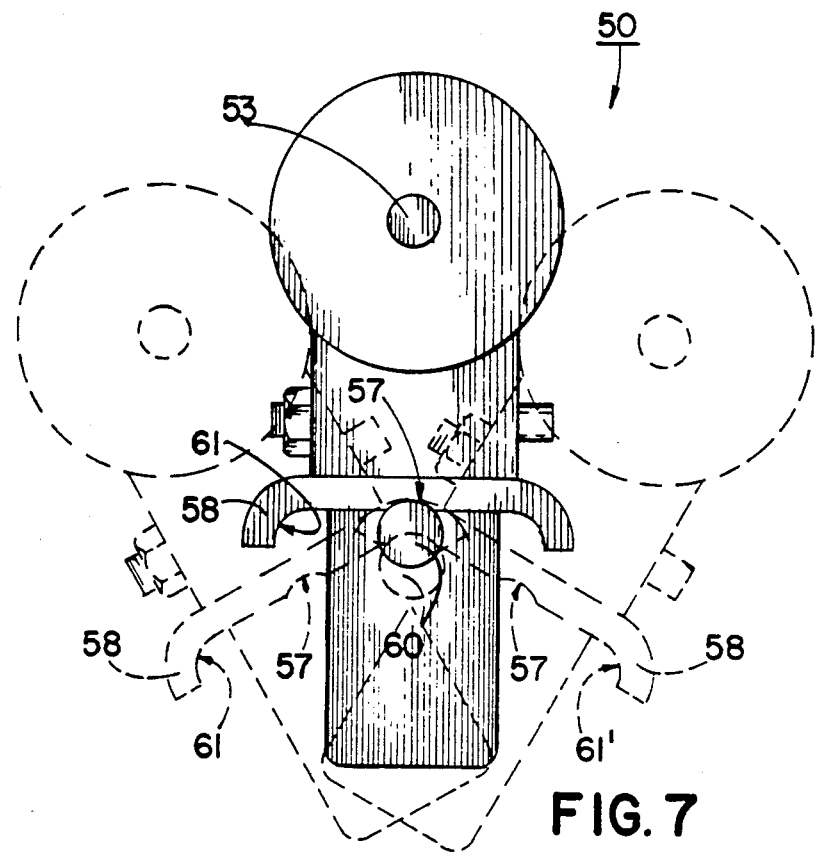
FIG. 7 depicts a partial top view of the caster assembly as shown in FIG. 6 along lines 7—7.
Figure 6:
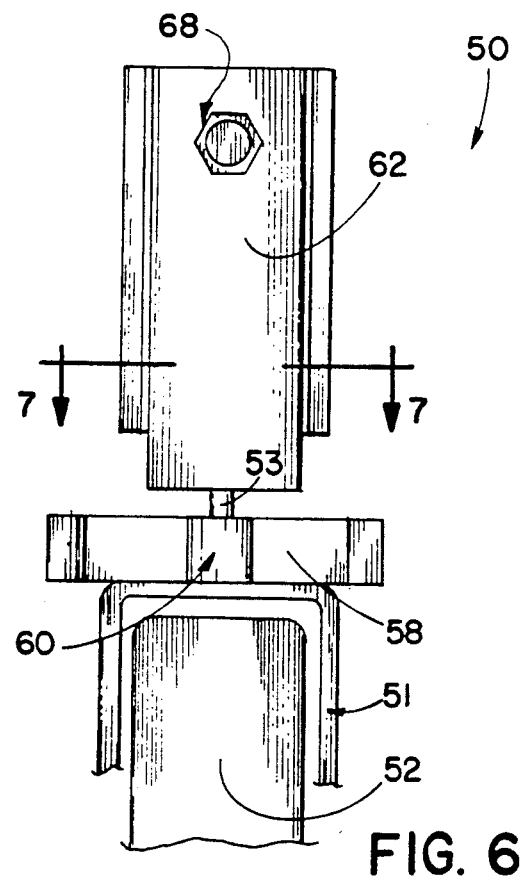
FIG. 6 illustrates a partial rear elevational view of a front caster assembly.
Figure 8:
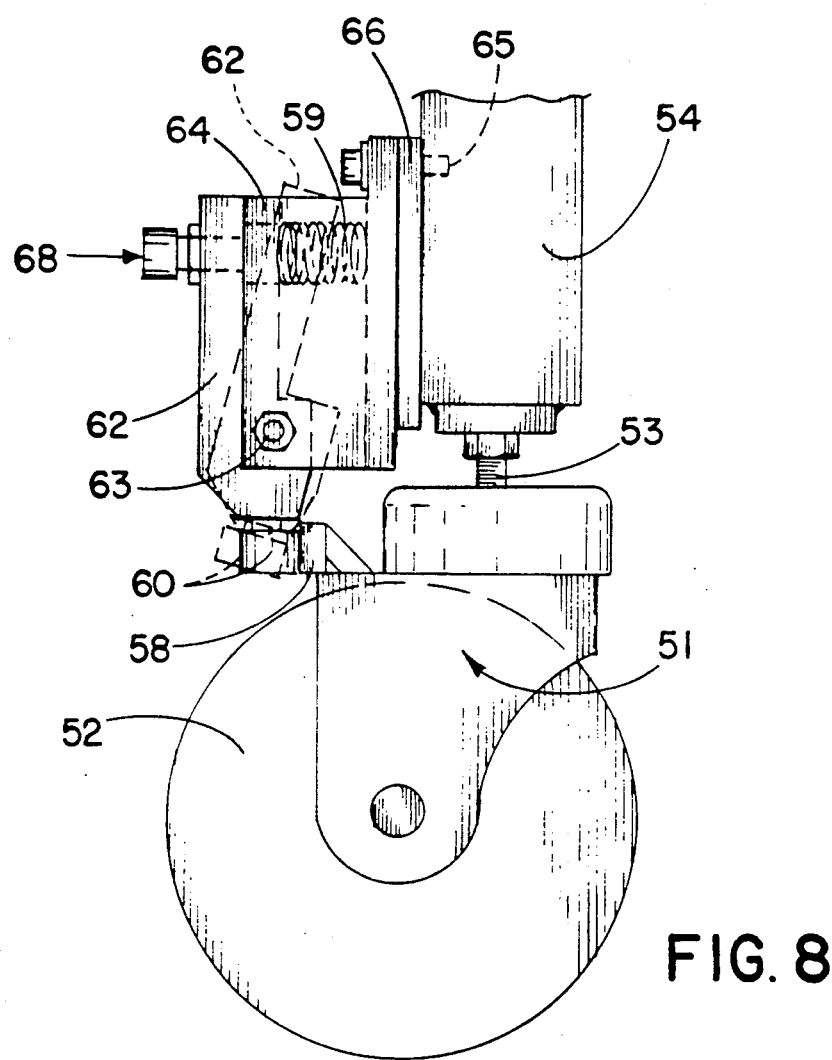
FIG. 8 demonstrates a partial side view of the caster assembly as shown in FIG. 6.

As seen in FIGS. 6, 7 and 8, front leg caster assembly 50 is selectively rotatable as shown in FIG. 7 to three different chosen positions. Caster assembly 50 includes wheel yoke 51 to which caster assembly wheel 52 is rotatably joined. Caster yoke post 53 is connected to front cart leg 54 as seen in FIG. 8, and cart 10 includes front legs 54, 54' with caster assemblies 50, 50' respectively attached thereto whereas rear legs 55, 55' have steerable wheels 56, 56' as shown in FIG. 1. As described herein, only one front caster assembly 50 is explained but as shown in FIG. 1, a pair of caster assemblies 50, 50' are affixed to the front legs 54, 54' of cart 10.

To finally laterally shift cart 10 once docking post 26 is engaged within guide post receptacle 34, the operator, by the use of cart handle 48 urges cart 10 to the right or left as necessary. When this occurs, detent member 58 as seen in FIG. 6 will force spring-loaded caster cylindrical guide member 60 out of central indention 57 to arcuate ends 61, 61' as seen in FIG. 7, to allow detent member 58 to slide to the right or left past cylindrical guide member 60. Cylindrical guide member 60 acts as a means to guide wheel 52 and is pivotally affixed to leg 54. Cylindrical member 60 is also affixed to pivot member 62 which is attached by axle 63 to housing 64 which in turn is affixed to front leg 54 of cart 10 by bolt 65. As further shown in FIG. 8, detent 58 is permanently attached to wheel yoke 51 and, in operation coil spring 59 urges cylindrical guide member 60 against detent member 58 by applying pressure to pivot member 62. As handle 48 is grasped and the rear of cart 10 shifted laterally, spring 59 is overpowered thus allowing detent member 58 to slide along cylindrical member 60 whereby wheel 52 is rotated to the right or left as desired, causing the front of the cart to shift laterally into more precise alignment with chamber rails 22, 23. Thereafter, cart 10 can be pushed slightly forward whereby cart rails 14 and 13 will more precisely align with chamber rails 22 and 23 respectively. Threaded adjusting member 68 as shown in FIG. 8 passes through threaded pivot member 62 and contacts rear wall 66 of housing 64. Thus, pivot member 62 can be adjusted to have more or less tension as cylindrical guide member 60 moves along detent member 58. The ability to change the direction of caster assembly wheels 52 of cart 10 allows the lateral movement of cart 10 which is required to achieve correct, precise rail abutment during insertion and extraction of carriage 11 into and out of sterilizer 30 and to prevent derailing of carriage 11 while providing convenience and ease to the operators. Pivot member 62 is shown in dotted fashion in its release position in FIG. 8.

The illustrations and examples provided herein are for explanatory purposes and are not intended to limit the scope of the appended claims.

I claim:

1. A cart comprising: a frame, a pair of rails mounted on said frame, a movable caster assembly joined to said frame, said caster assembly comprising a substantially linear laterally extending detent member, said detent member comprising a pair of arcuate ends, said arcuate ends extending rearwardly from said detent member, means to guide said caster assembly, a resilient member interconnected between a frame housing and said guide means for applying tension to said guide means, said detent member joined to said caster assembly, said detent member providing for said movement along said guide means, said arcuate ends for terminating movement of said detent member, and said guide means for receiving an increasing force as said arcuate ends of said detent member approach said guide means.

2. A cart as claimed in claim 1 wherein said guide means is cylindrical shaped.

3. A cart as claimed in claim 1 and including a pair of caster assemblies joined to said frame.

4. A cart as claimed in claim 1 wherein said detent member defines an indention for receiving said guide means.

5. A cart as claimed in claim 1 wherein said caster assembly comprises a wheel.

6. A cart as claimed in claim 1 wherein said resilient member comprises a coil spring.

* * * * *